(12) United States Patent
Zhang et al.

(10) Patent No.: US 12,510,078 B1
(45) Date of Patent: Dec. 30, 2025

(54) CHECK VALVE AND SCROLL COMPRESSOR

(71) Applicant: BITZER Refrigeration Technology (China) Co., Ltd., Beijing (CN)

(72) Inventors: Qiang Zhang, Beijing (CN); Zhipeng Wu, Beijing (CN); Hongjin Yuan, Beijing (CN); Chenhui Cui, Beijing (CN); Junliang Pei, Beijing (CN)

(73) Assignee: BITZER REFRIGERATION TECHNOLOGY (CHINA) CO., LTD., Beijing (CN)

( * ) Notice: Subject to any disclaimer, the term of this patent is extended or adjusted under 35 U.S.C. 154(b) by 0 days.

(21) Appl. No.: 18/880,372

(22) PCT Filed: Apr. 1, 2024

(86) PCT No.: PCT/CN2024/085339
§ 371 (c)(1),
(2) Date: Dec. 31, 2024

(87) PCT Pub. No.: WO2025/097655
PCT Pub. Date: May 15, 2025

(30) Foreign Application Priority Data

Nov. 10, 2023 (CN) .......................... 202323050427.6

(51) Int. Cl.
*F04C 28/24* (2006.01)
*F04C 18/02* (2006.01)
*F16K 15/02* (2006.01)

(52) U.S. Cl.
CPC .......... *F04C 28/24* (2013.01); *F04C 18/0207* (2013.01); *F16K 15/023* (2013.01); *F04C 2240/80* (2013.01)

(58) Field of Classification Search
CPC .. F04C 28/24; F04C 18/0207; F04C 2240/80; F16K 15/023
See application file for complete search history.

(56) References Cited

U.S. PATENT DOCUMENTS

2008/0101972 A1* 5/2008 Tarng .................. F04C 18/0215
418/55.6

FOREIGN PATENT DOCUMENTS

CN 200964950 Y 10/2007
CN 201810553 U 4/2011
(Continued)

OTHER PUBLICATIONS

Search Report dated Jun. 16, 2024 issued in corresponding International Application No. PCT/CN2024/085339.
(Continued)

*Primary Examiner* — Mary A Davis
(74) *Attorney, Agent, or Firm* — Nath, Goldberg & Meyer; Joshua B. Goldberg

(57) ABSTRACT

A check valve and a scroll compressor are provided. The check valve includes a valve plate, a washer, a valve stem, and a valve stopper. The valve stem is fixedly arranged between the valve plate and the valve stop, and the valve plate is provided with a valve hole for fluid to flow through. Annular outer, middle and inner stopper edges are provided on a bottom surface of the valve stopper from the edge to the center. A reverse flow hole is provided between the outer and middle stopper edges, and a ventilation port is provided on the middle stopper edge. The ventilation port is configured to connect a gap between the outer and middle stopper edges with the gap between the middle and inner stopper edges if the washer is in contact with the outer, middle and inner stopper edges.

9 Claims, 4 Drawing Sheets

(56) References Cited

FOREIGN PATENT DOCUMENTS

| | | | |
|---|---|---|---|
| CN | 102116292 A | * | 7/2011 |
| CN | 102121472 A | | 7/2011 |
| CN | 208966580 U | | 6/2019 |
| SU | 992878 A2 | | 1/1983 |
| TW | M311776 U | | 5/2007 |

OTHER PUBLICATIONS

Written Opinion dated Jun. 16, 2024 issued in corresponding International Application No. PCT/CN2024/085339.
Extended Search Report dated Aug. 26, 2025 issued in corresponding European Application No. 24826858.3.

* cited by examiner ured to compress refrigerant fluid, and an exhaust port of the
CHECK VALVE AND SCROLL COMPRESSOR The present disclosure is the national phase of International Patent Application No. PCT/CN2024/085339, titled "CHECK VALVE AND SCROLL COMPRESSOR", filed on Apr. 1, 2024, which claims priority to Chinese Patent Application No. 202323050427.6, titled "CHECK VALVE AND SCROLL COMPRESSOR", filed on Nov. 10, 2023 with the National Intellectual Property Administration, PRC, both of which are incorporated herein by reference in their entireties.

FIELD

The present disclosure relates to the field of refrigeration devices, and in particular to check valve, and in more particular to a scroll compressor.

BACKGROUND

Scroll compressors are widely used in fields such as refrigeration, air conditioning, and heat pumps due to their high efficiency, small size, light weight, and smooth operation.

In order to prevent reversing of the scroll compressor during shutdown, a check valve is usually arranged at a fluid outlet of the scroll assembly. In a case that the scroll compressor operates, a washer of the check valve moves upward along a direction of the refrigerant fluid discharged from the scroll assembly to open the valve hole, so as to allow the refrigerant fluid to flow out through the check valve. In a case that the scroll compressor is shut down, the washer moves downward under a pressure of a reflux fluid to close the valve hole, thereby preventing fluid reflux.

However, in a check valve of a conventional scroll compressor, due to the adhesion of lubricating oil or insufficient pressure difference between two sides of the washer, the washer cannot move downward quickly to close the valve hole when the scroll compressor is shut down, resulting in reverse noise during shutdown and the risk of wear and damage of components.

SUMMARY

A scroll compressor is provided according to the present disclosure, to solve the problems in the conventional art.

According to a first aspect of the present disclosure, a check valve is provided, which includes a valve plate, a washer, a valve stem, and a valve stopper. The valve stem is fixedly arranged between the valve plate and the valve stopper, the valve plate is provided with a valve hole for fluid to flow through, and an outer stopper edge, a middle stopper edge, and an inner stopper edge each having an annular shape are provided on the bottom surface of the valve stopper from the edge to the center. A reverse flow hole is provided between the outer stopper edge and the middle stopper edge, and a ventilation port is provided on the middle stopper edge. The ventilation port is configured to connect a gap between the outer stopper edge and the middle stopper edge with a gap between the middle stopper edge and the inner stopper edge in a case that the washer is in contact with the outer stopper edge, the middle stopper edge and the inner stopper edge. The washer is configured such that: in a case that there is fluid flowing out of the valve hole, the washer moves to a top dead center along the valve stem and is in contact with the outer stopper edge, the middle stopper edge and inner stopper edge of the valve stopper; and in a case that there is no more fluid flowing out of the valve hole, the fluid flows into the gap between the outer stopper edge and the middle stopper edge through the reverse flow hole, then flows into the gap between the middle stopper edge and the inner stopper edge through the ventilation port, the washer moves to a bottom dead center along the valve stem under a pressure of the fluid in the gap between the outer stopper edge and the middle stopper edge and the gap between the middle stopper edge and the inner stopper edge, to close the valve hole.

In an embodiment of the present disclosure, at least two reverse flow holes and at least two ventilation ports are provided along a circumference of the valve stopper.

In an embodiment of the present disclosure, the number of the reverse flow hole is the same as the number of the ventilation port, and each of the ventilation port is configured to be adjacent to a corresponding reverse flow hole.

In an embodiment of the present disclosure, the inner stopper edge, the outer stopper edge and the middle stopper edge has the same height.

In an embodiment of the present disclosure, the height of the inner stopper edge and the middle stopper edge has the same height that is lower than that of the outer stopper edge.

In an embodiment of the present disclosure, the inner stopper edge has a height lower than that of the middle stopper edge, and the middle stopper edge has a height lower than that of the outer stopper edge.

In an embodiment of the present disclosure, a support ring is fixedly provided between the valve stopper and the valve plate, and the support ring is sleeved on the valve stem. The washer is configured to move up and down along the support ring.

In an embodiment of the present disclosure, the valve stem, the valve stop and the support ring are integrally connected with each other.

According to the second aspect of the present disclosure, a scroll compressor is provided, which includes the check valve and a scroll assembly. The scroll assembly is configured to compress refrigerant fluid, and an exhaust port of the scroll assembly is connected to the valve hole. In a case that the scroll assembly operates, when the compressed refrigerant fluid flows out, the washer moves along the valve stem to the top dead center and is in contact with the outer stopper edge, the middle stopper edge and the inner stopper edge of the valve stopper; and in a case that the scroll assembly is shut down, the refrigerant fluid flows into the gap between the outer stopper edge and the middle stopper edge through the reverse flow hole, then flows into the gap between the middle stopper edge and the inner stopper edge through the ventilation port, the washer moves to the bottom dead center along the valve stem under a pressure of the fluid in the gap between the outer stopper edge and the middle stopper edge and the gap between the middle stopper edge and the inner stopper edge, to close the valve hole.

In a case that the check valve according to the present disclosure is applied to a scroll compressor, the valve hole is connected to an outlet of the scroll assembly, and the washer, a valve board and other structures of the check valve are all covered with lubricating oil. In a case that the scroll compressor operates, the refrigerant gas compressed by the scroll assembly flows out of the valve hole and lifts the washer to the top dead center of the valve stem. Under the pressure of the refrigerant gas, the washer is in contact with the outer stopper edge, the middle stopper edge and the inner stopper edge of the valve stopper, and under the pressure of the refrigerant gas and adhesion of the lubricating oil, the washer can maintain a state of contact with the outer stopper edge, the middle stopper edge and the inner stopper edge of the valve stopper. In a case that the washer moves along the valve stem to the top dead center, a central part of the washer can be in contact with the inner stopper edge, a radial middle part of the washer can be in contact with the middle stopper edge, and both the inner stopper edge and the middle stopper edge can support the washer.

In a case that the scroll compressor according to the present disclosure is shut down, a part of the refrigerant gas may flow in an opposite direction into the gap between the outer stopper edge and the middle stopper edge through the reverse flow hole, and flow into the gap between the middle stopper edge and the inner stopper edge through the ventilation port, to apply a pressure to the washer, so that the washer moves along the valve stem to the bottom dead center until falling on the valve plate, to seal the valve hole, preventing the refrigerant gas flowing in the opposite direction from flowing back into the scroll assembly.

In this way, in the check valve according to the present disclosure, as the refrigerant gas flows from the reverse flow hole into the gap between the outer stopper edge and the middle stopper edge, and flows into the gap between the middle stopper edge and the inner stopper edge through the ventilation port, the area of the reversely flowing refrigerant gas acting on the washer can be effectively increased, thereby increasing the pressure of the refrigerant gas on the washer and improving the separation speed of the washer and the valve stopper, thus improving the closing speed of the check valve according to the present disclosure.

Other features and advantages of the present disclosure will become clear through the detailed description of the exemplary embodiments of the present disclosure with reference to the drawings.

BRIEF DESCRIPTION OF THE DRAWINGS

The drawings, which are incorporated into and form a part of the specification, illustrate embodiments of the present disclosure and are used together with the description to explain the principles of the present disclosure.

Figure 1:
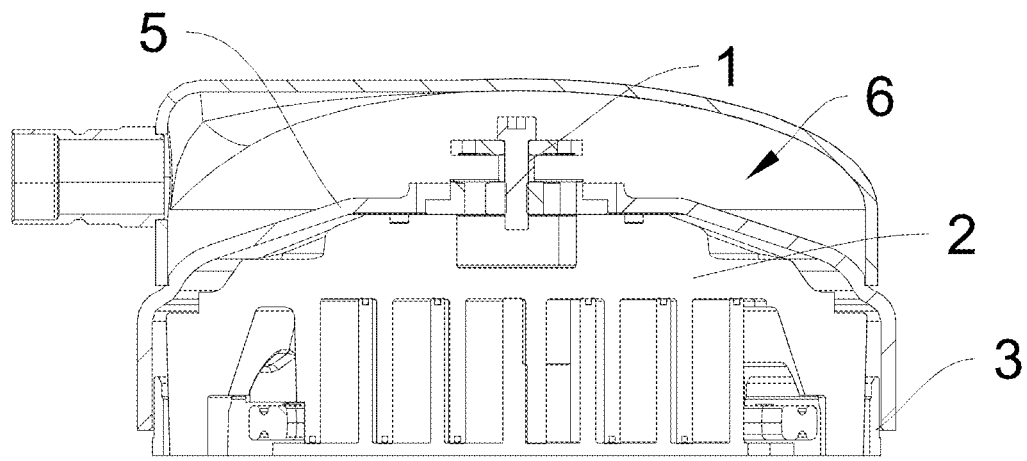
FIG. 1 is a schematic sectional view of a part of a scroll compressor according to an embodiment of the present disclosure.

The one-to-one correspondence between the component names and reference numerals in FIGS. 1 to 6 is described as follows:
1. Check valve; 11. Valve plate; 111. Valve hole; 12. Washer; 13. Valve stem; 14. Valve stopper; 141. Reverse flow hole; 142. Outer stopper edge; 143. Middle stopper edge; 144. Inner stopper edge; 145. Ventilation port; 15. Support ring; 2. Scroll assembly; 3. Shell; 5. Partition plate; 6. Chamber.

DETAILED DESCRIPTION OF EMBODIMENTS

Various exemplary embodiments of the present disclosure will now be described in detail with reference to the drawings. It should be noted that the relative arrangement of the components and steps, numerical expressions, and values described in these embodiments do not limit the scope of the present disclosure unless otherwise specified.

The following description of at least one exemplary embodiment is merely illustrative and should not be construed as any limitation on the present disclosure or its application or use.

The techniques, methods, and devices known to those skilled in the art may not be described in detail, but in appropriate circumstances, such techniques, methods, and devices should be considered as a part of the specification.

In all the examples shown and described herein, any specific value should be interpreted as merely illustrative rather than restrictive. Therefore, different values may be used for other examples in the exemplary embodiments.

It should be noted that similar labels and characters represent similar items in the figures. Therefore, once an item is defined in one figure, such item does not need to be further described in subsequent figures.

Herein, the terms "top", "bottom", "front", "back", "left", "right" and the like are used only to indicate relative positional relationship between related parts, rather than defining the absolute positions of such related parts.

Herein, the terms "first", "second" and the like are used only for distinguishing each other, rather than indicating the importance and order, or the premise of mutual existence.

Herein, the terms "equal", "same" and the like are not limitations in a strict mathematical and/or geometrical sense, but also encompass errors that are understandable to those skilled in the art and are permitted by manufacture or use, etc.

Unless otherwise indicated, the range of values herein includes not only the entire range within its two endpoints, but also a number of sub-ranges contained therein.

A check valve is provided according to the present disclosure, which is applied to a scroll compressor. The scroll compressor of the present disclosure includes at least a shell, a motor, and a scroll assembly. The shell is provided with a gas inlet and a gas outlet, and the motor is arranged in the shell and configured to drive the scroll assembly to compress a refrigerant fluid. A partition plate is provided on the scroll assembly, and a chamber is formed between the partition plate and the shell. The gas outlet is arranged on a side wall of the chamber, which is used to accommodate compressed refrigerant gas. The partition plate is used to prevent gas leakage of the scroll assembly and protect the scroll assembly.

An opening is provided at the center of the partition plate, and an exhaust port of the scroll assembly is arranged below the opening. The check valve of the present disclosure is arranged in the opening. During the operation of the scroll compressor, the refrigerant gas compressed by the scroll assembly may open the check valve and flow into the chamber through the check valve, and then be discharged from a gas outlet. In a case that the scroll compressor is shut down, the check valve automatically closes to prevent the high-pressure refrigerant gas in the chamber from flowing back into the scroll assembly, thus avoiding liquid impact on the scroll assembly.

Specifically, the check valve of the present disclosure includes a valve plate, a washer, a valve stem, and a valve stopper. The valve stem is fixedly arranged between the valve plate and the valve stopper, and the washer may move along the valve stem between the valve plate and the valve stopper. Specifically, the valve plate is fixedly arranged on a fix scroll member of the scroll assembly, and the valve plate is provided with a valve hole for fluid to flow through. An outer stopper edge, a middle stopper edge and an inner stopper edge each having an annular shape are provided on the bottom surface of the valve stopper from the edge to the center. A reverse flow hole is provided between the outer stopper edge and the middle stopper edge, and a ventilation port is provided on the middle stopper edge. The ventilation port is configured to connect the gap between the outer stopper edge and the middle stopper edge with the gap between the middle stopper edge and the inner stopper edge in a case that the washer is in contact with the outer stopper edge, the middle stopper edge and the inner stopper edge.

The washer is configured such that in a case that there is fluid flowing out of the valve hole, the washer moves to a top dead center along the valve stem and is in contact with the outer stopper edge, the middle stopper edge and inner stopper edge of the valve stopper; and in a case that there is no more fluid flowing out of the valve hole, the fluid flows into the gap between the middle stopper edge and the inner stopper edge from the reverse flow hole, the washer moves to a bottom dead center along the valve stem under a pressure of the fluid in the gap between the outer stopper edge and the middle stopper edge and the gap between the middle stopper edge and the inner stopper edge, to close the valve hole.

In a case that the check valve according to the present disclosure is applied to a scroll compressor, the valve hole is connected to an outlet of the scroll assembly, and the washer, a valve board and other structures of the check valve are all covered with lubricating oil. In a case that the scroll compressor operates, the refrigerant gas compressed by the scroll assembly flows out of the valve hole and lifts the washer to the top dead center of the valve stem. Under the pressure of the refrigerant gas, the washer is in contact with the outer stopper edge, the middle stopper edge and the inner stopper edge of the valve stopper, and under the pressure of the refrigerant gas and adhesion of the lubricating oil, the washer can maintain a state of contact with the outer stopper edge, the middle stopper edge and the inner stopper edge of the valve stopper. In a case that the washer moves along the valve stem to the top dead center, a central part of the washer can be in contact with the inner stopper edge, a radial middle part of the washer can be in contact with the middle stopper edge, and both the inner stopper edge and the middle stopper edge can support the washer.

In a case that the scroll compressor according to the present disclosure is shut down, a part of the refrigerant gas may flow in an opposite direction into the gap between the outer stopper edge and the middle stopper edge through the reverse flow hole, and flow into the gap between the middle stopper edge and the inner stopper edge through the ventilation port, to apply a pressure to the washer, so that the washer moves along the valve stem to the bottom dead center until falling on the valve plate, to seal the valve hole, preventing the refrigerant gas flowing in the opposite direction from flowing back into the scroll assembly.

In this way, in the check valve according to the present disclosure, as the refrigerant gas flows from the reverse flow hole into the gap between the outer stopper edge and the middle stopper edge, and flows into the gap between the middle stopper edge and the inner stopper edge through the ventilation port, the area of the reversely flowing refrigerant gas acting on the washer can be effectively increased, thereby increasing the pressure of the refrigerant gas on the washer and improving the separation speed of the washer and the valve stopper, thus improving the closing speed of the check valve according to the present disclosure.

For ease of understanding, a specific structure and operating principle of the check valve of the present disclosure will be described in detail with reference to FIGS. 1 to 6, in conjunction with an embodiment. It should be noted that a scroll compressor is further provided according to the present disclosure, which will be described together with the check valve to maintain the simplicity of the text.

Figure 2:
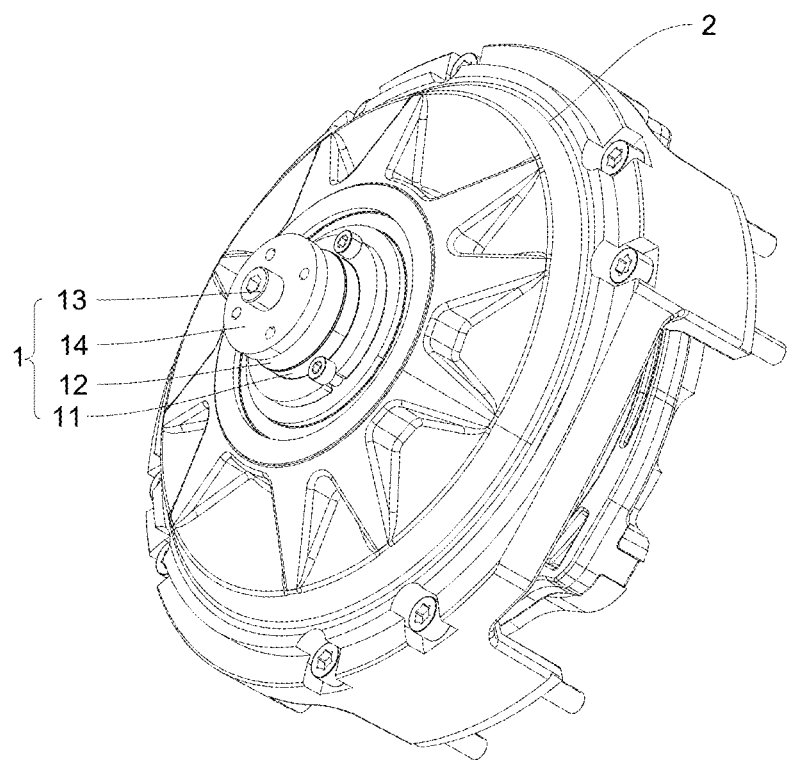
FIG. 2 is a schematic three-dimensional view of a check valve and a scroll assembly according to an embodiment of the present disclosure.

As shown in FIGS. 1 and 2, a check valve 1 is provided according to the present disclosure, which is applied to a scroll compressor. As shown in FIG. 1, the scroll compressor of the present disclosure includes at least a shell 3, a motor, and a scroll assembly 2. The shell 3 is provided with a gas inlet and a gas outlet, and the motor is arranged in the shell 3 and used to drive scroll assembly 2 to compress refrigerant fluid. A partition plate 5 is provided on the scroll assembly 2, where a chamber 6 is formed between the partition plate 5 and the shell 3. The gas outlet is arranged on a side wall of the chamber 6, the chamber 6 is used to accommodate compressed refrigerant gas. The partition plate 5 is used to prevent gas leakage of the scroll assembly 2 and protect the scroll assembly 2.

As shown in FIG. 1, an opening is provided at the center of the partition plate 5, and an exhaust port of the scroll assembly 2 is arranged below the opening. The check valve 1 of the present disclosure is arranged in the opening. During the operation of the scroll compressor, the refrigerant gas compressed by the scroll assembly 2 may open the check valve 1 and flow into the chamber 6 from the check valve 1, and then be discharged from the gas outlet. In a case that the scroll compressor is shut down, the check valve 1 automatically closes to prevent the high-pressure refrigerant gas in the chamber 6 from flowing back into the scroll assembly 2, thus avoiding liquid impact on the scroll assembly 2.

Figure 3:
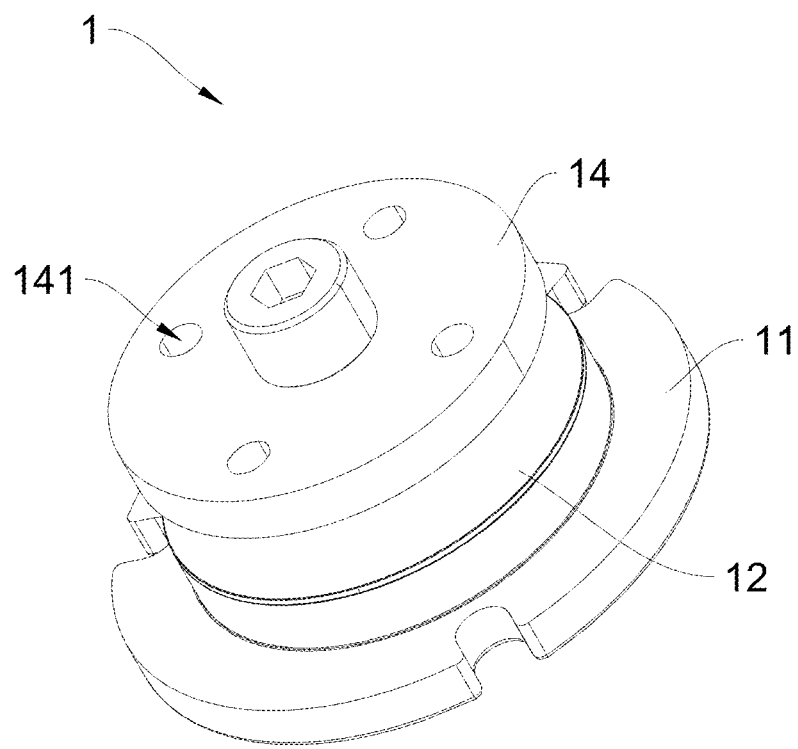
FIG. 3 is a schematic three-dimensional view of a check valve according to an embodiment of the present disclosure.
Figure 4:
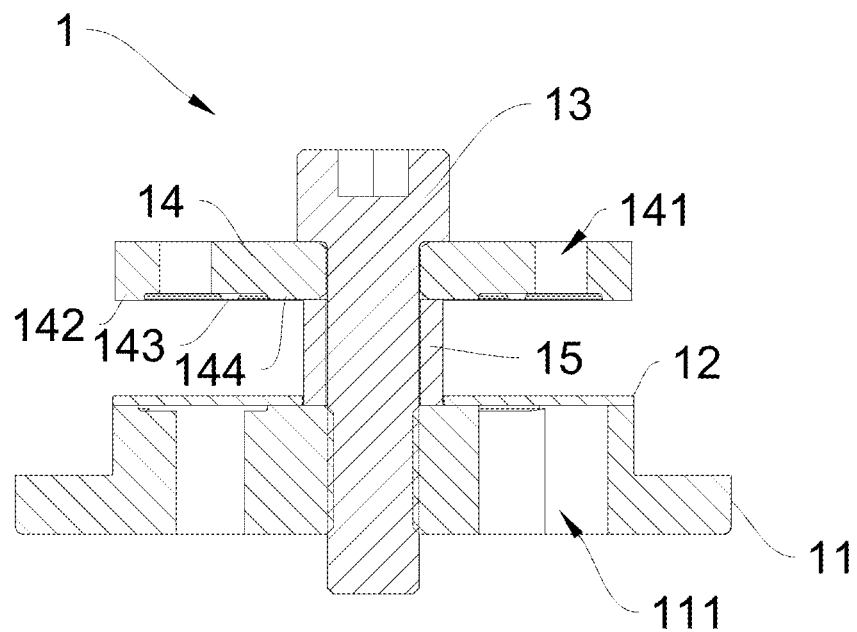
FIG. 4 is a schematic sectional view of a check valve according to an embodiment of the present disclosure.
Figure 5:
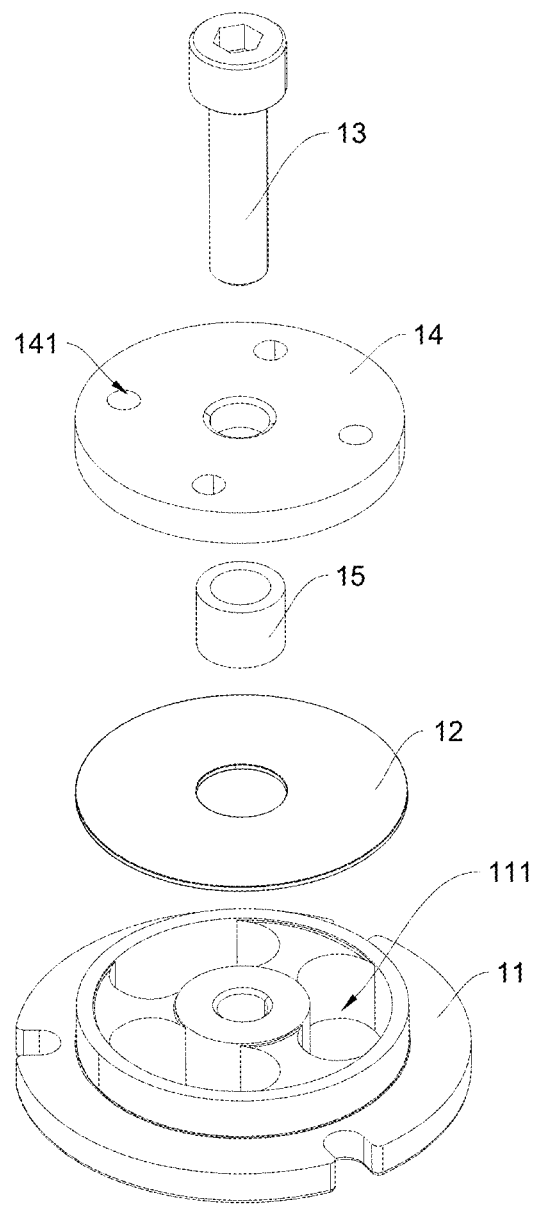
FIG. 5 is a schematic explosive view of a check valve according to an embodiment of the present disclosure.

Specifically, as shown in FIGS. 3 to 5, in an embodiment of the present disclosure, the check valve 1 of the present disclosure includes a valve plate 11, a washer 12, a valve stem 13 and a valve stopper 14. The valve stem 13 is fixedly arranged between the valve plate 11 and the valve stopper 14, and the washer 12 may move between the valve plate 11 and the valve stopper 14 along the valve stem 13.

Specifically, the valve plate 11 is fixedly arranged on a fix scroll member of the scroll assembly 2, and the valve plate 11 is provided with a valve hole 111 for fluid to flow through. As shown in FIG. 5, the number of the valve hole 111 may be one, two or more, and the shape of the valve hole 111 may also be specifically set as needed, which is not limited herein. The valve stopper 14 is fixedly arranged above the valve plate 11, with valve stem 13 passing through the valve stopper 14 and the valve plate 11. The washer 12 is sleeved on the valve stem 13 and can move between valve plate 11 and valve stopper 14 along valve stem 13.

In order to facilitate the fixing of valve stopper 14 above valve plate 11, as shown in FIGS. 4 and 5, in an embodiment of the present disclosure, a support ring 15 is fixedly provided between the valve stopper 14 and the valve plate 11. The support ring 15 is sleeved on the valve stem 13, and the washer 12 is configured to move up and down along the support ring 15. By arranging the support ring 15 between the valve stopper 14 and the valve plate 11, the support ring 15 may support the valve stopper 14 above the valve plate 11, to form an interval between the valve stopper 14 and the valve plate 11 for the washer 12 to move. Moreover, the support ring 15 is sleeved on the valve stem 13, and the washer 12 may move up and down between the valve stopper 14 and the valve plate 11 along the support ring 15. In order to keep the valve stem 13 fixed to the valve stopper 14, the support ring 15 and the valve plate 11, the valve stem 13 may include a stem body and a clamping portion with a diameter larger than that of the stem body. The stem body of the valve stem 13 extends through the valve stopper 14, the support ring 15 and the valve plate 11, and the clamping portion is clamped above the valve stopper 14.

It may be understood that in an embodiment of the present disclosure, the valve stem 13, the valve stopper 14 and the support ring 15 are integrally connected with each other, that is, the valve stem 13, the valve stopper 14 and the support ring 15 are processed by using an integrated molding process, which can effectively reduce the processing steps of the valve stem 13, the valve stopper 14 and the support ring 15, and improve the bonding strength between the valve stem 13, the valve stopper 14 and the support ring 15.

Figure 6:
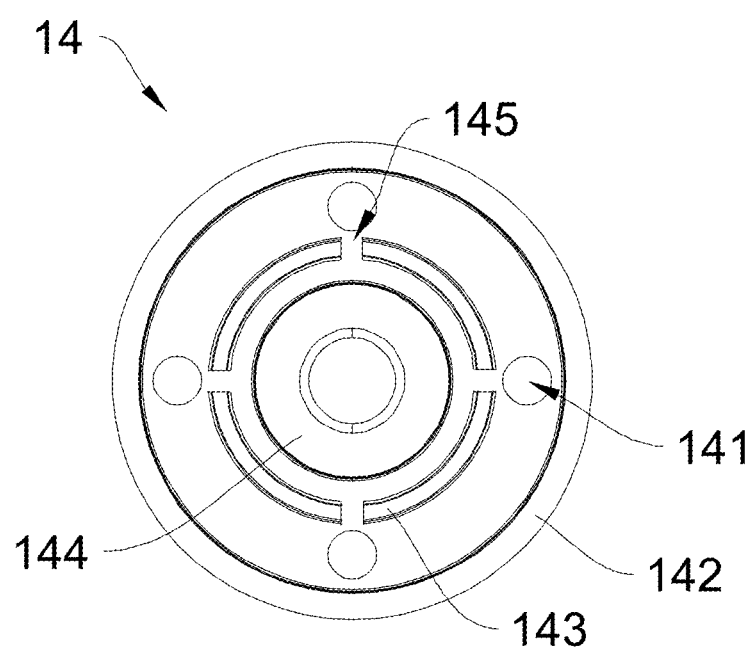
FIG. 6 is a schematic view of a bottom surface of a valve stopper according to an embodiment of the present disclosure.

As shown in FIG. 6, an outer stopper edge 142, a middle stopper edge 143 and an inner stopper edge 144 each having an annular shape are provided on the bottom surface of the valve stopper 14 from the edge to the center. A reverse flow hole 141 is provided between the outer stopper edge 142 and the middle stopper edge 143, and a ventilation port 145 is provided on the middle stopper edge 143. The ventilation port 145 is configured to connect the gap between the outer stopper edge 142 and the middle stopper edge 143 with the gap between the middle stopper edge 143 and the inner stopper edge 144 in a case that the washer 12 is in contact with the outer stopper edge 142, the middle stopper edge 143 and the inner stopper edge 144.

The washer 12 is configured such that in a case that there is fluid flowing out of the valve hole 111, the washer 12 moves to a top dead center along the valve stem 13 and is in contact with the outer stopper edge 142, the middle stopper edge 143 and the inner stopper edge 144 of the valve stopper 14; and in a case that there is no more fluid flowing out of the valve hole 111, the fluid flows into the gap between the outer stopper edge 142 and the middle stopper edge 143 through the reverse flow hole 141, then flows into the gap between the middle stopper edge 143 and the inner stopper edge 144 through the ventilation port 145, the washer 12 moves to a bottom dead center along the valve stem 13 under a pressure of the fluid in the gap between the outer stopper edge 142 and the middle stopper edge 143 and the gap between the middle stopper edge 143 and the inner stopper edge 144, to close the valve hole 111.

In this way, in a case that the check valve 1 of the present disclosure is applied to a scroll compressor, the valve hole 111 is connected to an outlet of the scroll assembly 2, and the washer 12, a valve board and other structures of the check valve 1 are all covered with lubricating oil. In a case that the scroll compressor operates, the refrigerant gas compressed by the scroll assembly 2 may flow out of the valve hole 111 and lift the washer 12 to the top dead center of the valve stem 13. Under the pressure of the refrigerant gas, the washer 12 is in contact with the outer stopper edge 142, the middle stopper edge 143 and the inner stopper edge 144 of the valve stopper 14, and under the pressure of the refrigerant gas and the adhesion of the lubricating oil, the washer 12 can maintain a state of contact with the outer stopper edge 142, the middle stopper edge 143 and the inner stopper edge 144 of the valve stopper 14.

In a case that the washer 12 moves to the top dead center along the valve stem 13, a central part of the washer 12 can be in contact with the inner stopper edge 144, and a radial middle part of the washer 12 can be in contact with the middle stopper edge 143, and both the inner stopper edge 144 and the middle stopper edge 143 can support the washer 12.

In a case that the scroll compressor of the present disclosure is shut down, a part of the refrigerant gas may flow in an opposite direction into the gap between the outer stopper 142 and the middle stopper 143 through the reverse flow hole 141, and flow into the gap between the middle stopper 143 and the inner stopper 144 through the ventilation port 145, to apply a pressure to the washer 12, so that the washer 12 moves along the valve stem 13 to the bottom dead center until falling on the valve plate 11, to seal the valve hole 111, thereby preventing the refrigerant gas flowing in the opposite direction from flowing back into the scroll assembly 2.

In this way, in the check valve 1 according to the present disclosure, as the refrigerant gas flows from the reverse flow hole 141 into the gap between the outer stopper edge 142 and the middle stopper edge 143, and flows into the gap between the middle stopper edge 143 and the inner stopper edge 144 through the ventilation port 145, the area of the reversely flowing refrigerant gas acting on the washer 12 can be effectively increased, thereby increasing the pressure of the refrigerant gas on the washer 12 and improving the separation speed of the washer 12 and the valve stopper 14, thus improving the closing speed of the check valve 1 according to the present disclosure.

As shown in FIG. 4, in an embodiment of the present disclosure, the inner stopper edge 144, the outer stopper edge 142 and the middle stopper edge 143 have the same height. In this way, in a case that the washer 12 moves along the valve stem 13 to the top dead center, the parts of the washer 12 that are in contact with the inner stopper edge 144 and the middle stopper edge 143 can be kept flush with an original shape of the washer 12, thereby preventing excessive deformation of the washer 12.

In another embodiment of the present disclosure, the inner stopper edge 144 and the middle stopper edge 143 have the same height lower than that of the outer stopper edge 142. In a case that the washer 12 moves along the valve stem 13 to the top dead center, the washer 12 may be deformed partially, and then in contact with the inner stopper edges 144 and the middle stopper edge 143. The cross-section of the overall washer 12 is similar to a trapezoid. In a case that the scroll compressor is shut down, the pressure of the refrigerant gas is released, and the washer 12 may overcome the adhesion effect of the lubricating oil under its own elastic force to separate from the inner stopper edge 144 and the middle stopper edge 143, thereby restoring from its own deformation, thus improving the separation speed of washer 12 and valve stopper 14.

Similarly, in another embodiment of the present disclosure, the inner stopper edge 144 has a height lower than that of the middle stopper edge 143, and the middle stopper edge 143 has a height lower than that of the outer stopper edge 142. In a case that the washer 12 moves along the valve stem 13 to the top dead center, the washer 12 may be deformed partially, and then in contact with the inner stopper edge 144 and the middle stopper edge 143. The cross-section of the overall washer 12 is similar to a cone shape. In a case that the scroll compressor is shut down, the pressure of the refrigerant gas is released, and the washer 12 may overcome the adhesion effect of lubricating oil under its own elastic force to separate from the inner stopper edge 144 and the middle stopper edge 143, thereby restoring from its own deformation, thus improving the separation speed of the washer 12 and the valve stopper 14.

As shown in FIG. 4, in an embodiment of the present disclosure, the top of the support ring 15 is configured to abut against the inner stopper edge 144. In this way, it can effectively ensure that the central part of the washer 12 can be in contact with the inner stopper edge 144 in a case that the washer 12 moves along the valve stem 13 to the top dead center, thereby supporting the central part of the washer 12 by the inner stopper edge 144.

Furthermore, as shown in FIG. 6, at least two reverse flow holes 141 and at least two ventilation ports 145 are provided along the circumference of the valve stopper 14. Due to the arrangement of the at least two reverse flow holes 141 and the at least two ventilation ports 145 along the circumference of valve stopper 14, in a case that the scroll compressor is shut down, more reversely flowing refrigerant gas may flow from the reverse flow holes 141 into the gap between the outer stopper edge 142 and the middle stopper edge 143, and then flow into the gap between the middle stopper edge 143 and the inner stopper edge 144 from the ventilation ports 145, thereby increasing the pressure of refrigerant gas on the washer 12. In this way, the pressure of the refrigerant gas on the washer 12 can be increased, thereby improving the separation speed of washer 12 and valve stopper 14, thus increasing the closing speed of the check valve 1 of the present disclosure.

Furthermore, as shown in FIG. 6, in an embodiment of the present disclosure, the number of the reverse flow holes 141 and the number of the ventilation ports 145 are the same, and each ventilation port 145 is configured to be adjacent to a corresponding reverse flow hole 141. Due to the equal number of the reverse flow holes 141 and the ventilation ports 145, and the proximity of each ventilation port 145 to the corresponding reverse flow hole 141, the refrigerant gas can not only quickly flow into the gap between the outer stopper edge 142 and the middle stopper edge 143 after entering the reverse flow hole 141, but also quickly flow into the gap between the middle stopper edge 143 and the inner stopper edge 144 from the ventilation port 145 corresponding to the reverse flow hole 141, so that the pressure of the refrigerant gas on the washer 12 is increased quickly, thereby improving the separation speed of the washer 12 and the valve stopper 14, thus increasing the closing speed of the check valve 1 of the present disclosure.

As shown in FIGS. 1 to 5, a scroll compressor is provided according to the present disclosure, which includes the aforementioned check valve 1 and a scroll assembly 2. The scroll assembly 2 is configured to compress refrigerant fluid, and an exhaust port of the scroll assembly 2 is connected to the valve hole 111. In a case that the scroll assembly 2 operates, when the compressed refrigerant fluid flows out, the washer 12 moves along the valve stem 13 to the top dead center and is in contact with the outer stopper edge 142, the middle stopper edge 143 and the inner stopper edge 144 of the valve stopper 14. In a case that the scroll assembly 2 is shut down, the refrigerant fluid flows into the gap between the outer stopper edge 142 and the middle stopper edge 143 through the reverse flow hole 141, and then flows into the gap between the middle stopper edge 143 and the inner stopper edge 144 through the ventilation port 145. The washer 12 moves along the valve stem 13 to the bottom dead center under the pressure of the fluid in the gap between the outer stopper edge 142 and the middle stopper edge 143 and the gap between the middle stopper edge 143 and the inner stopper edge 144 to close the valve hole 111.

In the scroll compressor of the present disclosure, the valve hole 111 is connected to the outlet of scroll assembly 2, and the washer 12, a valve board and other structures of check valve 1 are all covered with lubricating oil. In a case that the scroll compressor operates, the refrigerant gas compressed by the scroll assembly 2 may flow out of the valve hole 111 and lift the washer 12 to the top dead center of the valve stem 13. Under the pressure of the refrigerant gas, the washer 12 is in contact with the outer stopper edge 142, the middle stopper edge 143 and the inner stopper edge 144 of valve stopper 14, and under the pressure of the refrigerant gas and the adhesion of the lubricating oil, the washer 12 can maintain a state of contact with the outer stopper edge 142, the middle stopper edge 143 and the inner stopper edge 144 of valve stopper 14.

In a case that the washer 12 moves to the top dead center along the valve stem 13, a central part of the washer 12 may be in contact with the inner stopper edge 144, and a radial middle part of the washer 12 may be in contact with the middle stopper edge 143, and both the inner stopper edge 144 and the middle stopper edge 143 may support the washer 12.

In a case that the scroll compressor of the present disclosure is shut down, a part of the refrigerant gas may flow in an opposite direction into the gap between the outer stopper 142 and the middle stopper 143 through the reverse flow hole 141, and flow into the gap between the middle stopper 143 and the inner stopper 144 through the ventilation port 145, to apply a pressure to the washer 12, so that the washer 12 moves along the valve stem 13 to the bottom dead center until falling on the valve plate 11, to seal the valve hole 111, thereby preventing the refrigerant gas flowing in the opposite direction from flowing back into the scroll assembly 2.

As the refrigerant gas flows from the reverse flow hole 141 into the gap between the outer stopper edge 142 and the middle stopper edge 143, and flows into the gap between the middle stopper edge 143 and the inner stopper edge 144 through the ventilation port 145, the area of the reversely flowing refrigerant gas acting on the washer 12 can be effectively increased, thereby increasing the pressure of the refrigerant gas on the washer 12 and improving the separation speed of the washer 12 and the valve stopper 14, thus improving the closing speed of the check valve 1 according to the present disclosure.

Various embodiments of the present disclosure have been described above, and the foregoing description is exemplary and not exhaustive, and is not limited to the disclosed embodiments. Many modifications and changes made without departing from the scope and spirit of the disclosed embodiments will be apparent to those skilled in the art. The terms used herein is chosen to best explain the principles of the embodiments, practical applications, or improvements to techniques in the marketplace, or to enable others of ordinary skill in the art to understand the embodiments disclosed herein. The scope of the present disclosure is limited by the claims.

The invention claimed is:

1. A check valve, comprising a valve plate, a washer, a valve stem, and a valve stopper, wherein
   the valve stem is fixedly arranged between the valve plate and the valve stopper,
   the valve plate is provided with a valve hole for fluid to flow through,
   an outer stopper edge, a middle stopper edge, and an inner stopper edge each having an annular shape are provided on a bottom surface of the valve stopper from an edge to a center,
   a reverse flow hole is provided between the outer stopper edge and the middle stopper edge, and a ventilation port is provided on the middle stopper edge, and the ventilation port is configured to connect a gap between the outer stopper edge and the middle stopper edge with a gap between the middle stopper edge and the inner stopper edge in a case that the washer is in contact with the outer stopper edge, the middle stopper edge, and the inner stopper edge; and the washer is configured such that:
- in a case that there is fluid flowing out of the valve hole, the washer moves to a top dead center along the valve stem and is in contact with the outer stopper edge, the middle stopper edge, and inner stopper edge of the valve stopper; and
- in a case that there is no more fluid flowing out of the valve hole, the fluid flows into the gap between the outer stopper edge and the middle stopper edge through the reverse flow hole, then flows into the gap between the middle stopper edge and the inner stopper edge through the ventilation port, the washer moves to a bottom dead center along the valve stem under a pressure of the fluid in the gap between the outer stopper edge and the middle stopper edge and the gap between the middle stopper edge and the inner stopper edge, to close the valve hole.

2. The check valve according to claim 1, wherein at least two reverse flow holes and at least two ventilation ports are provided along a circumference of the valve stopper.

3. The check valve according to claim 1, wherein the number of the reverse flow hole is the same as that of the ventilation port, and each of the ventilation port is configured to be adjacent to a corresponding reverse flow hole.

4. The check valve according to claim 1, wherein the inner stopper edge, the outer stopper edge, and the middle stopper edge have the same height.

5. The check valve according to claim 1, wherein the inner stopper edge and the middle stopper edge have the same height that is lower than that of the outer stopper edge.

6. The check valve according to claim 1, wherein the inner stopper edge has a height lower than that of the middle stopper edge, and the middle stopper edge has a height lower than that of the outer stopper edge.

7. The check valve according to claim 1, wherein a support ring is fixedly provided between the valve stopper and the valve plate, the support ring is sleeved on the valve stem, and the washer is configured to move up and down along the support ring.

8. The check valve according to claim 7, wherein the valve stem, the valve stopper, and the support ring are integrally connected with each other.

9. A scroll compressor, comprising:
- the check valve according to any one of claim 1; and
- a scroll assembly, configured to compress a refrigerant fluid, wherein an exhaust port of the scroll assembly is connected to the valve hole,
- in a case that the scroll assembly operates, when a compressed refrigerant fluid flows out, the washer moves to the top dead center along the valve stem and is in contact with the outer stopper edge, the middle stopper edge, and the inner stopper edge of the valve stopper, and
- in a case that the scroll assembly is shut down, the refrigerant fluid flows into the gap between the outer stopper edge and the middle stopper edge through the reverse flow hole, then flows into the gap between the middle stopper edge and the inner stopper edge through the ventilation port, the washer moves to the bottom dead center along the valve stem under a pressure of the fluid in the gap between the outer stopper edge and the middle stopper edge and the gap between the middle stopper edge and the inner stopper edge, to close the valve hole.

* * * * *